(12) United States Patent
Nagashima et al.

(10) Patent No.: US 6,644,728 B1
(45) Date of Patent: Nov. 11, 2003

(54) SUNROOF DEVICE

(75) Inventors: Youji Nagashima, Toyota (JP); Hiroshi Makino, Nagoya (JP); Kenji Maeta, Kariya (JP); Hironori Ochiai, Chiryu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/697,426

(22) Filed: Oct. 27, 2000

(30) Foreign Application Priority Data

Oct. 29, 1999 (JP) .......................................... 11-310226

(51) Int. Cl.$^7$ ................................................ B60J 10/12
(52) U.S. Cl. .............. 296/213; 296/216.06; 296/216.08
(58) Field of Search ........................... 296/213, 216.07, 296/216.08, 216.06

(56) References Cited

U.S. PATENT DOCUMENTS

| | | | | |
|---|---|---|---|---|
| 4,729,596 A | * | 3/1988 | Fujihara et al. | 296/218 |
| 4,772,066 A | * | 9/1988 | Leschke et al. | 296/213 |
| 5,022,705 A | * | 6/1991 | Takahashi | 296/216.08 |
| 5,149,170 A | * | 9/1992 | Matsubara et al. | 296/213 |
| 5,332,282 A | * | 7/1994 | Maeda et al. | 296/213 |
| 5,466,038 A | * | 11/1995 | Fujie et al. | 296/213 |
| 5,527,086 A | * | 6/1996 | Mori et al. | 296/213 |
| 5,599,059 A | * | 2/1997 | Shann | 296/216.08 |
| 5,664,827 A | * | 9/1997 | Mori et al. | 296/213 |
| 5,810,429 A | * | 9/1998 | Jardin et al. | 296/213 |
| 5,902,008 A | * | 5/1999 | Butsuen et al. | 296/213 |
| 5,941,598 A | * | 8/1999 | Cave et al. | 296/213 |
| 6,062,636 A | * | 5/2000 | Thyssen | 296/213 |
| 6,065,801 A | * | 5/2000 | Kawamura et al. | 296/213 |
| 6,129,413 A | * | 10/2000 | Klein | 296/216.08 |
| 6,196,625 B1 | * | 3/2001 | Nagashima et al. | 296/213 |

FOREIGN PATENT DOCUMENTS

| | | | | |
|---|---|---|---|---|
| DE | 35 25 320 | | 1/1987 | |
| DE | 39 40 503 | | 12/1990 | |
| EP | 0460768 a1 | * | 12/1991 | 296/213 |
| JP | 362034815 A | * | 2/1987 | 296/213 |
| JP | 404266526 A | * | 9/1992 | 296/213 |
| JP | 6-336119 | | 12/1994 | |
| JP | 6-336120 | * | 12/1994 | |
| JP | 11-278062 | | 10/1999 | |

* cited by examiner

Primary Examiner—Stephen T. Gordon
Assistant Examiner—Hilary Gutman
(74) Attorney, Agent, or Firm—Finnegan, Henderson, Farabow, Garrett & Dunner, L.L.P.

(57) ABSTRACT

A sunroof device is made up of a pair of guide rails placed at laterally opposed inner peripheries of an open area of a vehicle. The pair of guide rails support a movable panel covering and uncovering the open area. A first gutter portion extends along a lengthwise direction of the guide rail. A second gutter portion is positioned below the first gutter portion and is brought into fluid communication with an end of the first gutter portion, characterized in that the second gutter portion is formed with an upstanding wall located at a distance from the end of the first gutter portion when the second gutter portion is brought into an overlap condition in such a manner that the upstanding wall defines an area of the second gutter portion to be overlapped with the first gutter portion. An easy connection can be made between the first gutter portion and the second gutter portion.

7 Claims, 8 Drawing Sheets

SUNROOF DEVICE

BACKGROUND OF THE INVENTION

1. Field of the Invention

The present invention is directed to a vehicular sunroof device wherein a guide rail and a front frame are constructed in separate fashion and the guide rail is also provided with a gutter portion.

2. Prior Art

One of the conventional or prior art sunroof devices of the type is disclosed in, for example, Japanese Unexamined Patent Publication (so-called "KOKAI KOHOH") No. H06-336119. This conventional or prior art sunroof device is made up of a pair of guide rails provided on a pair of inner peripheries of an open portion formed in a vehicular roof panel. Each of the guide rails includes a first gutter portion and a guide portion which is formed integrally with the first gutter portion, and supports a movable panel which covers and uncovers the open portion of the vehicular roof panel. A front frame placed on a front peripheral portion of the open portion of the vehicular roof panel, connected to both of the guide rails has a second gutter portion which is in fluid communication with the first gutter portion. A concave groove is formed in a connecting portion at which the guide rail and the front frame are connected. An upstanding wall is formed as a part of the second gutter portion at the connecting portion at which the guide rail and the front frame are connected. The first gutter portion is fitted or inserted into the second gutter portion such that the upstanding wall is made to be placed in the concave groove at the connecting portion at which the guide rail and the front frame are connected and a sealing member is provided between the guide rail and the front frame.

However, in the conventional or prior art sunroof device having the aforementioned structure, when the first gutter portion is brought into overlapped engagement with the second gutter portion, the sealing member confronts with the extremity end of the first gutter portion. Such a structure makes it easy for water that flows into the first gutter portion to contact the sealing member, resulting in that the water flowing in the first gutter portion along the sealing member is drained from a drain port. Thus, in the conventional or prior art sunroof device, it is required to establish a severe water tight sealing treatment for the connection portion of the guide rail and the front frame. For this sealing treatment, a butyl rubber sealing member, or a foamed sealing member is used. In addition, for securing the sealing member there, the connecting portion is required to be reinforced at which the guide rail and the front frame are connected.

In the prior sunroof device, for preventing water leakage, the firm connection for sealing between the guide rail and the front frame is treated. In an occasion of some troubles on the parts of the sunroof, and when the connection has to be released in order to replace the broken parts, because the firm connection makes difficult release of the guide rail and the front frame, sometimes the guide rail deforms and damages the rail.

Thus, for overcoming the aforementioned drawbacks, a sunroof device needs an easy connection between a front gutter portion and a second gutter portion.

SUMMARY OF THE INVENTION

The present invention has been developed to satisfy the requirement noted above and a first aspect of the present invention provides a sunroof device which comprises: a pair of guide rails placed at laterally opposed inner peripheries of an open area and supporting a movable panel covering and uncovering the open area;

a first gutter portion extending along a lengthwise direction of the guide rail; and a second gutter portion positioned below the first gutter portion and brought into fluid communication with an end of the first gutter portion, the second gutter portion being formed with an upstanding wall locating at a distance from the end of the first gutter portion when the second gutter portion is brought into overlap condition in such a manner that the upstanding wall defines an area of the second gutter portion to be overlapped with the first gutter portion.

In accordance with the first aspect of the present invention, the upstanding wall of second gutter portion is provided at a longitudinal distance from the end of the first gutter portion, which makes it possible to prevent a direct invasion of fluid such as rain water into the overlapped portion between the upstanding wall and the first gutter portion. Thus, a sealing member disposed between the first gutter portion and the second gutter portion, is not limited as a bonding agent. Because only a foamed sealing member without a bonding agent is used for the connection sealing of the first gutter portion and the second gutter portion, the productivity in assembling the sunroof devices is improved, and also replacement of the sunroof device becomes possible, resulting in increasing or improving the recycling of the sunroof device.

Preferably, as the second aspect of the present invention indicates, it desirable to employ a structure wherein in the vicinity of a portion in the second gutter portion at which the second gutter portion is overlapped with the first gutter portion, a restricting wall is formed for restricting flow of fluid in the second gutter portion.

Such a structure makes it difficult for fluid to enter into the overlapped portion of the first gutter portion and the second gutter portion, with the result that the sealing function becomes more improved and preferable.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

Figure 1:
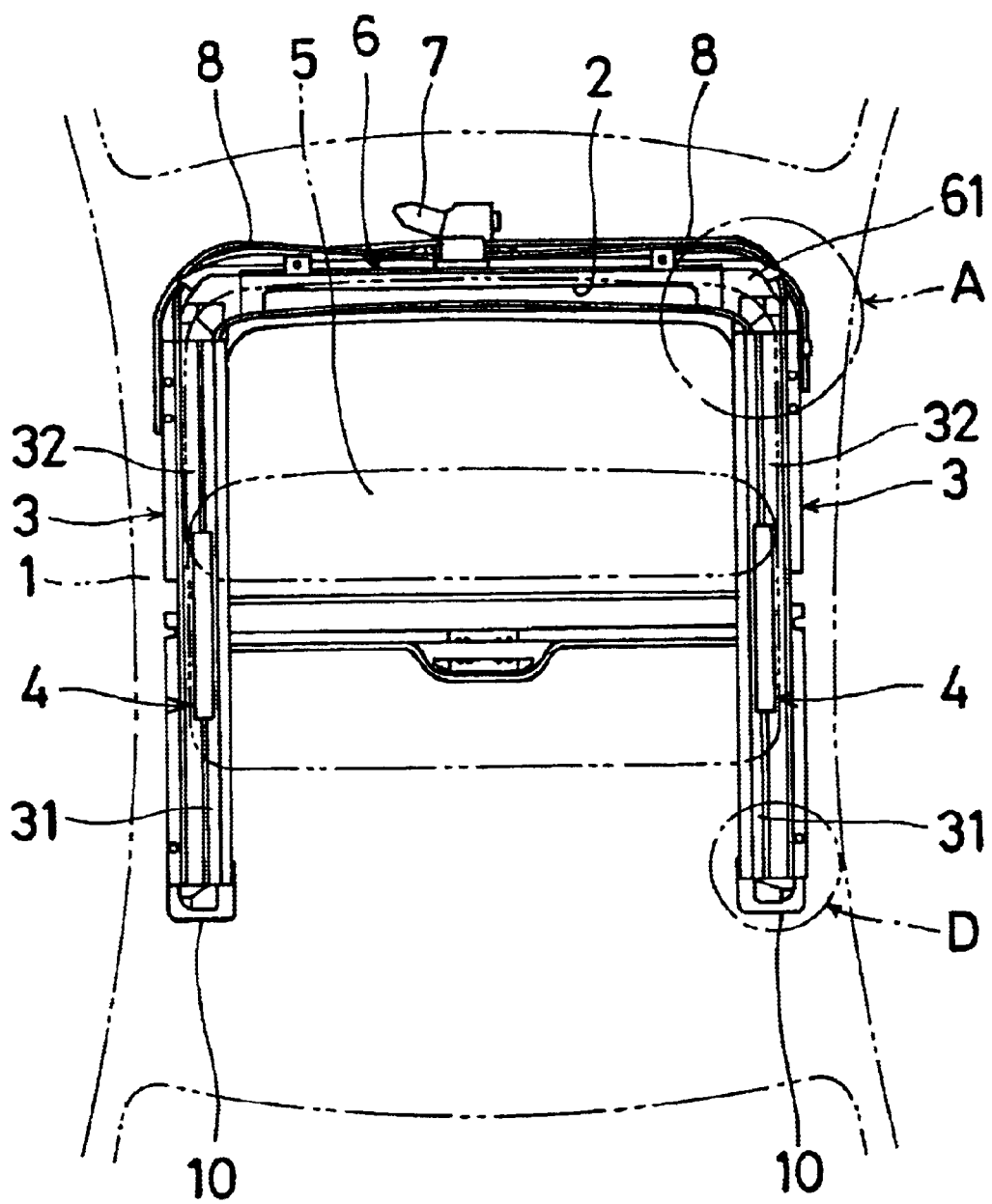
FIG. 1 illustrates a plan view of a vehicle body on which is mounted a sunroof device as an embodiment of the present invention.
Figure 2:
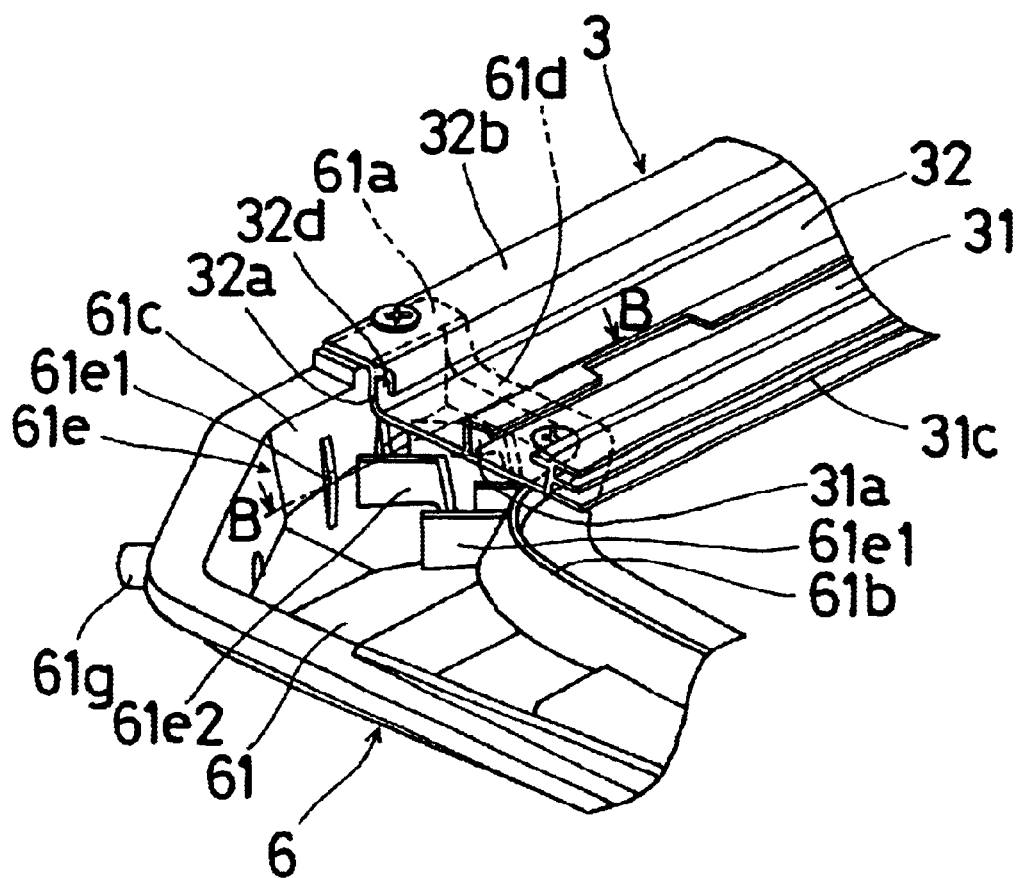
FIG. 2 illustrates an enlarged rotated view of a portion encircled with 'A' in FIG. 1.
Figure 3:
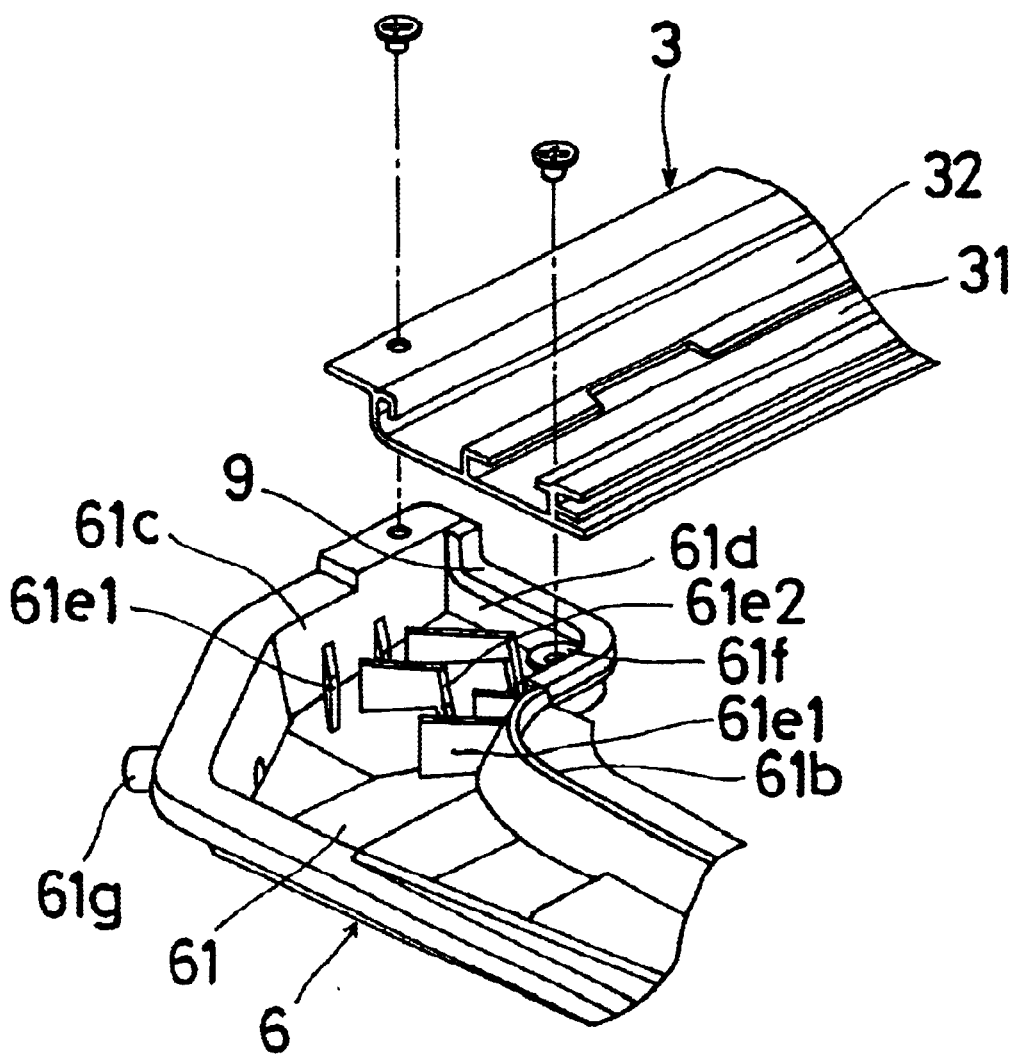
FIG. 3 illustrates an enlarged view of the sunroof device before being assembled.
Figure 4:
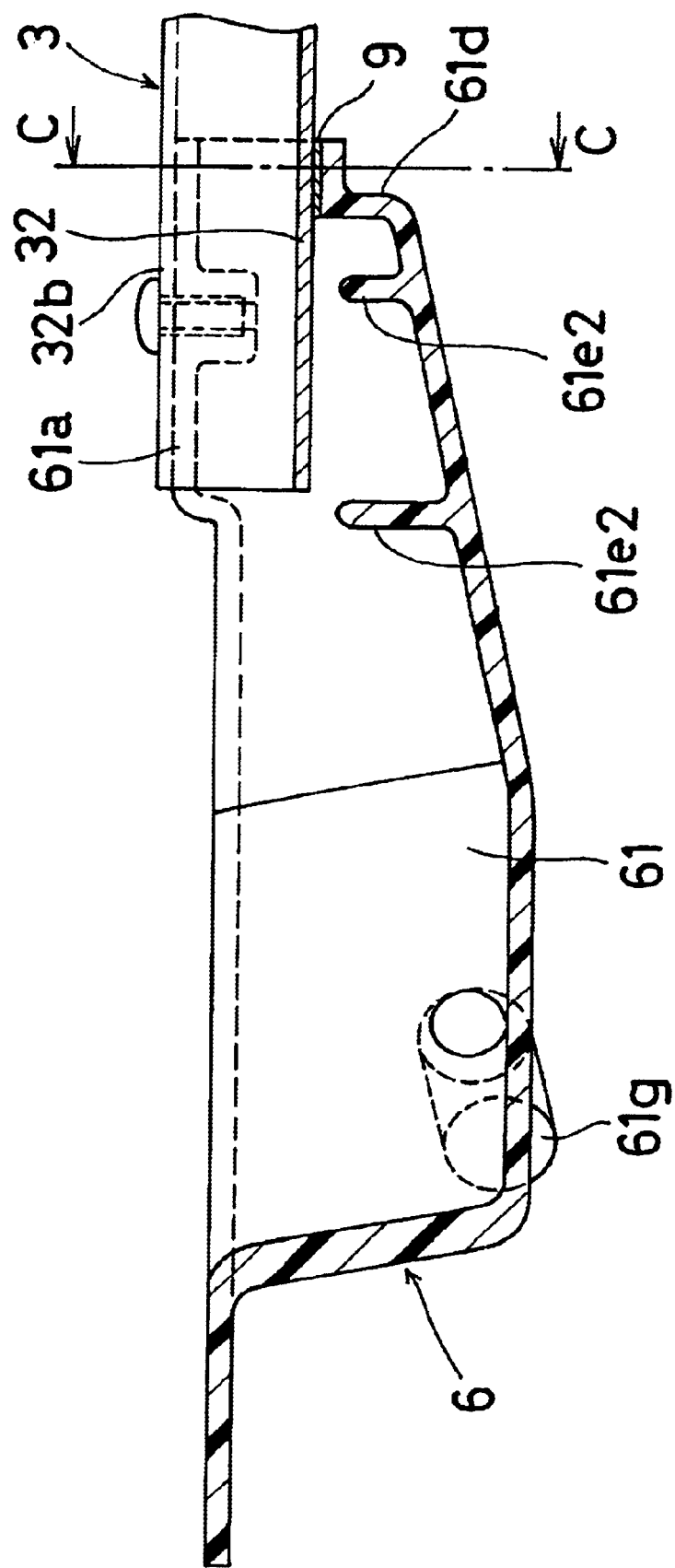
FIG. 4 illustrates a cross-sectional view taken along line B—B in FIG. 2.
Figure 5:
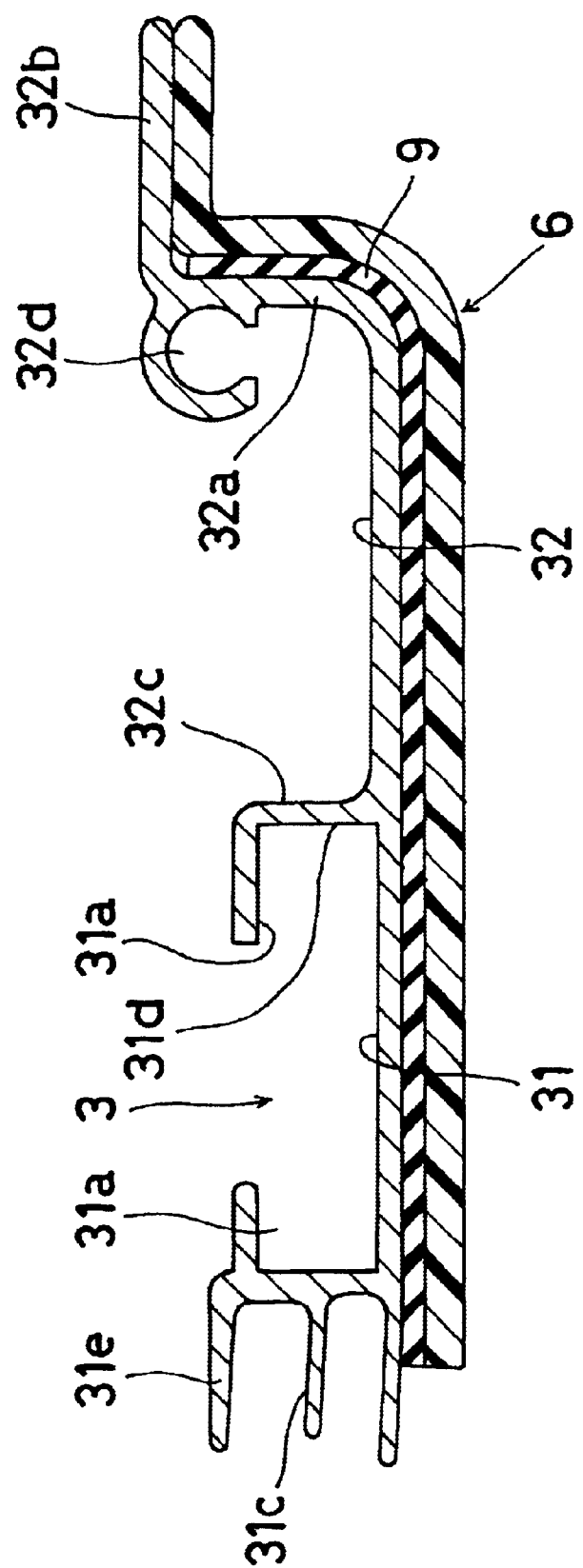
FIG. 5 illustrates a cross-sectional view taken along line C—C in FIG. 4.

With reference to FIG. 1, a vehicular roof panel 1 comprises an open portion 2. A pair of guide rails 3, 3 (right and left side) extending in a vehicular longitudinal direction, which is in coincidence with the vertical direction in FIG. 1, are arranged along a pair of opposed inner peripheries of the open portion 2 respectively, and are secured thereto. A slide panel 5 is secured, by way of well-known link mechanism (not shown), to each of the guide rails 3, 3 slidably in the vehicular longitudinal direction. At a front periphery of the open portion, there is provided a front frame 6 to which each of the guide rails 3, 3 is connected by connecting mechanism as will be detailed later. In addition, a well-known driving mechanism 7 is fixed to the front frame 6 and is operatively connected to each link mechanism by cables (not shown). The cables are geared cables which are slidably fitted in pipes 8 and the guide rails 3, 3.

In the foregoing structure, when the driving mechanism 7 is driven in one direction, the resulting force is transmitted by the cables and the link mechanism to the slide panel 5, then the slide panel 5 moves in the vehicular longitudinal rearward direction to open the open portion 2. On the other hand, when the driving mechanism 7 is driven in the other direction, the open portion 2 is covered.

As illustrated in FIGS. 2 to 5, the guide rail 3 is made to be integrated with a guide portion 31 and a first gutter portion 32. The guide portion 31 slidably supports the slide panel 5 and extends in the longitudinal direction of the rail. The first gutter portion 32 is designed to be located below the contact portion of the slide panel 5 peripheral with the roof panel 5, when the open portion 2 is covered. The guide portion 31 is formed to be integrated with a groove portion 31a and a groove portion 31c. The groove portion 31a along side walls 31d and 31e serves for slidably guiding a link mechanism 4. The groove portion 31c along side wall 31e serves for slidably guiding a sun shade (not shown). The first gutter portion 32 is substantially U-shaped in cross-section and is formed as an integrated structure with a flange portion 32b and a groove portion 32d. The flange portion 32b serves as a mounting portion on the roof panel 1. The groove portion 32d serves for guiding therein the cable. The guide portion 31 and the first gutter portion 32 are formed in such a manner that the guide portion 31 is inward from the first gutter portion 32 in a vehicular lateral direction by forming the side wall 31d of the guide portion 31 and the side wall 32c of the first gutter portion 32 as a plate. The guide rail 3 may be formed through aluminum extrusion.

The front frame 6, which has a substantial U-shaped cross-section, is located below the front contact portion of the slide panel 1 peripheral with the roof panel 5, when the open portion 2 is covered. The front frame 6 has an integrally formed second gutter portion 61 extending in the lengthwise direction of the front frame 6. The second gutter portion 61 has an upstanding wall 61d located at a distance from the lengthwise end of the first gutter portion 32, and the upstanding wall 61d defines the second gutter portion 61 area when second gutter portion 61 overlaps with the first gutter portion 32 and the guide portion 31. Moreover, in a portion of the second gutter portion 61 at which the second gutter portion 61 is overlapped with the first gutter portion, flow restriction walls 61e are provided for restricting rain water flow from the second gutter portion 61 toward the upstanding wall 61d. The first and second flow restriction walls 61e1 and 61e2 of the flow restriction walls 61e are arranged alternately. The first flow restriction walls 61e1 extend inwardly from both of the side walls 61b and 61c of the second gutter portion 61 so as to be spaced from the upstanding wall 61d, while the second flow restriction walls 61e2 are formed into a V-shape in plan and are oriented to the upstanding wall 61d between the side walls 61b and 61c of the second gutter portion 61. In the present embodiment, one of the two second restrict walls 61e2 is located nearer to the upstanding wall 61d than the end of the first gutter portion 32, which makes possible to restrict the flow of fluid fallen into the second gutter portion 61 from the first gutter portion 32 toward the upstanding wall 61d. Thus the flow restriction walls 61e function to cause the fluid flow delay toward the upstanding wall 61d and prevent the fluid from splashing by direct hitting on the upstanding wall 61d. It is to be noted that the upstanding wall 61d, the first and second flow restrict walls 61e1 and 61e2, and the second gutter portion 61 are formed integrally with the front frame 6. In addition, at a corner portion of the front frame 6, there is provided an integral drain port 61g for the fluid in the second gutter portion 61. The second gutter portion 61 has a slanted slope structure made as the corner portion to be the lowest level for guiding the fluid flow from the second gutter portion 62 into the drain port 61g. The front frame 6 is formed from reinforced nylon by molding, as is well known.

In the present embodiment, the first gutter portion 32 and the second gutter portion 61 are formed integrally with the guide rail 3 and the front frame 6, respectively, and this integration makes it possible to connect the first gutter portion 32 and the second gutter portion 61 when the guide rail 3 and the front frame 6 are connected with each other which will be detailed later.

The first gutter portion 32 is in fluid communication with the second gutter portion 61 by the connection between the guide rail 3 and the front frame 6. The assembling of the first gutter portion 32 with the second gutter portion 61 takes the following steps. The first gutter portion 32 is inserted into the second gutter portion 61 in such a manner that the resulting overlapped relation does not extend to the corner of the front frame 6. Screw fastening apertures are tapped between the flange portion 32b of the guide rail 3 and the flange portion 61a of the front frame 6 and between the guide portion 31 of the guide rail 3 and the mounting portion 61f of the second gutter portion 61, respectively. Between the first gutter portion 32 and the upstanding wall 61d of the second gutter portion 61, a foamed sealing member 9 is inserted. This sealing member is provided in a cross-sectional space defined by the first gutter portion 32, the guide portion 31, and the second gutter portion 61. The tapping screw connection is made at a location nearer to the end of the guide rail 3 than to the upstanding wall 61d, and both of the first gutter portion 32 and the guide portion 31 are overlapped on the second gutter portion 61 to guide rain water into the second gutter portion 61.

Figure 6:
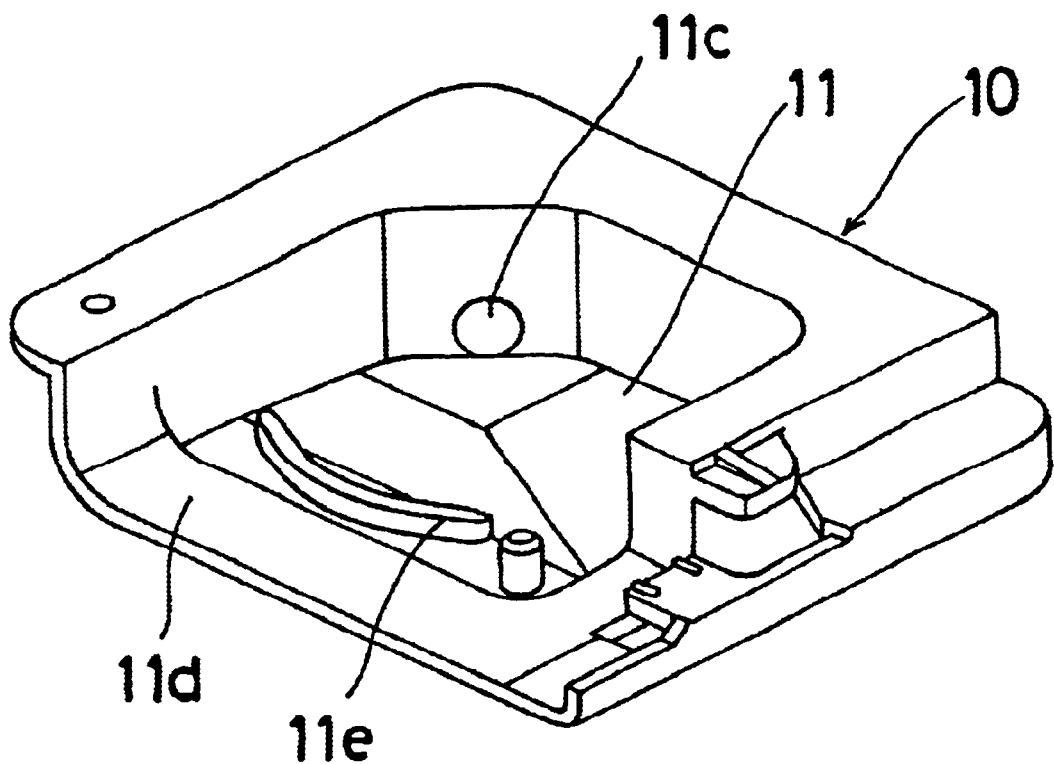
FIG. 6 illustrates an enlarged rotated view of a portion encircled with 'D' in FIG. 1.

With reference to FIG. 6, which is an enlarged illustration of a portion 'D' in FIG. 1, there is illustrated a piece member 10 which closes, in fluid-tight fashion, a rear end of the first gutter portion 32 of the guide rail 3. As can be seen from FIG. 6, the piece member 10 includes an integrally formed gutter section 11 which is placed within a vehicular roof (not shown) and which is connected to an end of the first gutter portion 32 with fluid-communication below the first gutter portion 32. The gutter section 11 of the piece member 10 comprises an upstanding wall 11d located at a distance from the longitudinal end of the first gutter portion 32 when the gutter section 11 is overlapped with the first gutter portion 32 so as to define an overlapping area of the gutter section 11 with the first gutter portion 32 and the guide portion 31.

Moreover, at a portion in the gutter section 11 that is near the overlapping portion of the gutter section 11 and the first gutter portion 32, a flow restriction wall 11e for the prevention of the flow of water toward the overlapping portion of the gutter section 11 and the first gutter portion 32. In addition, at a corner of the piece member 10, there is formed a drain port 11c to drain water to the outside of the piece member 10. The piece member 10, similar to the front frame 6, is formed from reinforced nylon by molding. Between the upstanding wall 11d of the gutter section 11 and the first gutter section 32, there is interposed a sealing member (not shown) similar to the aforementioned front sealing structure. The guide rail 3 and the piece member 11 are fastened by tapping screws, by which the connection establishes a fluid-communication between the first gutter portion 32 and the gutter section 11.

As described above, the portions at which the first gutter portion 32 and the second gutter portion 61, or gutter section 11 are overlapped are positioned at a longitudinal distance from the ends of the first gutter portion 32. In addition, forming the upstanding flow restriction walls 61e, or gutter section 11e in the second gutter portion 61, 11 directs the water flowing into the second gutter portion 61, or gutter section 11 to be away from the overlapped position, and allows the water drain through the drain ports. The sealing member does not need full sealing performance and the material used for the sealing member is not restricted. As the result, a bonding agent is not needed and advantages are realized for the production or repair of sunroof devices.

Figure 7:
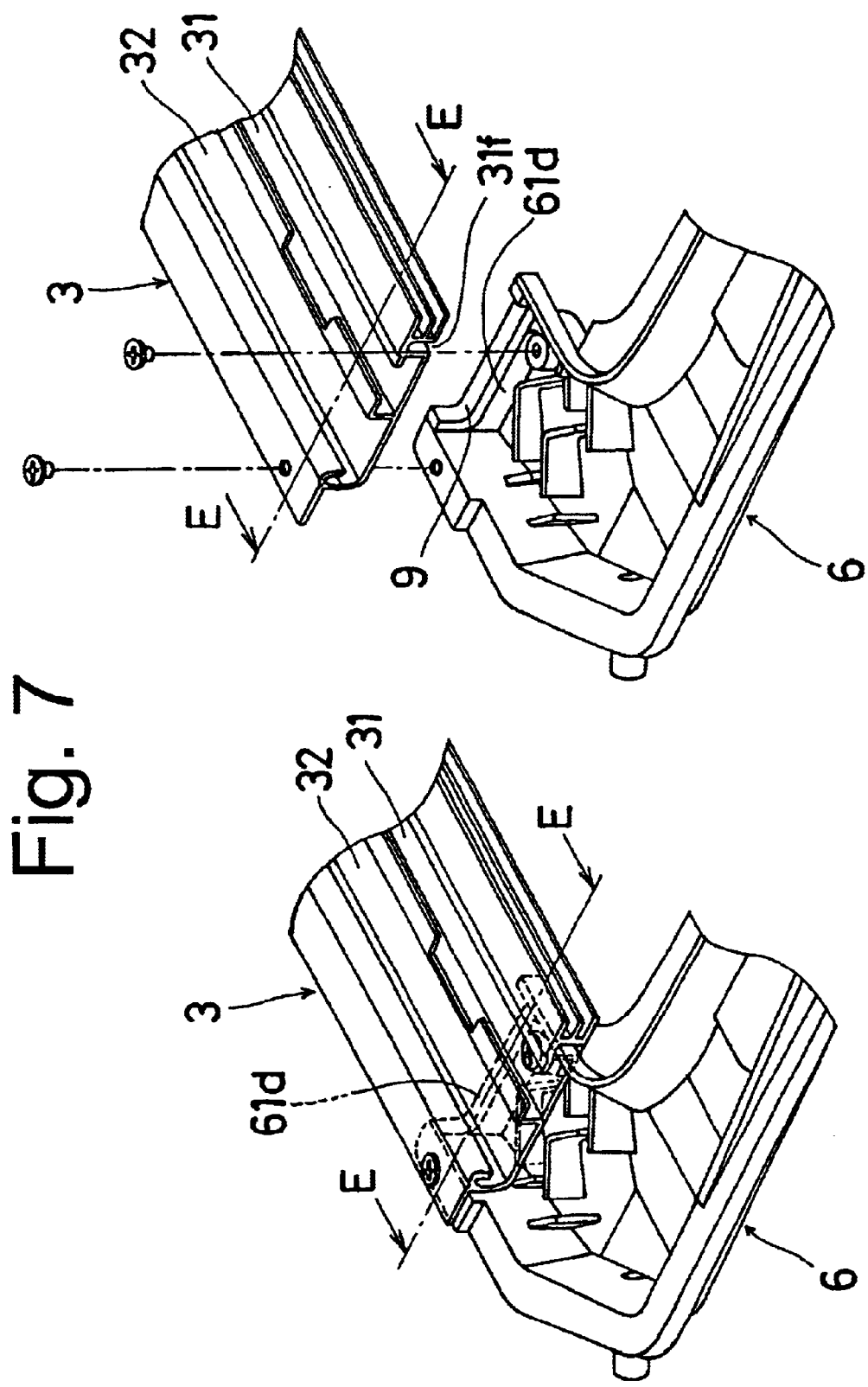
FIG. 7 illustrates a modification of the structure shown in FIG. 3.
Figure 8:
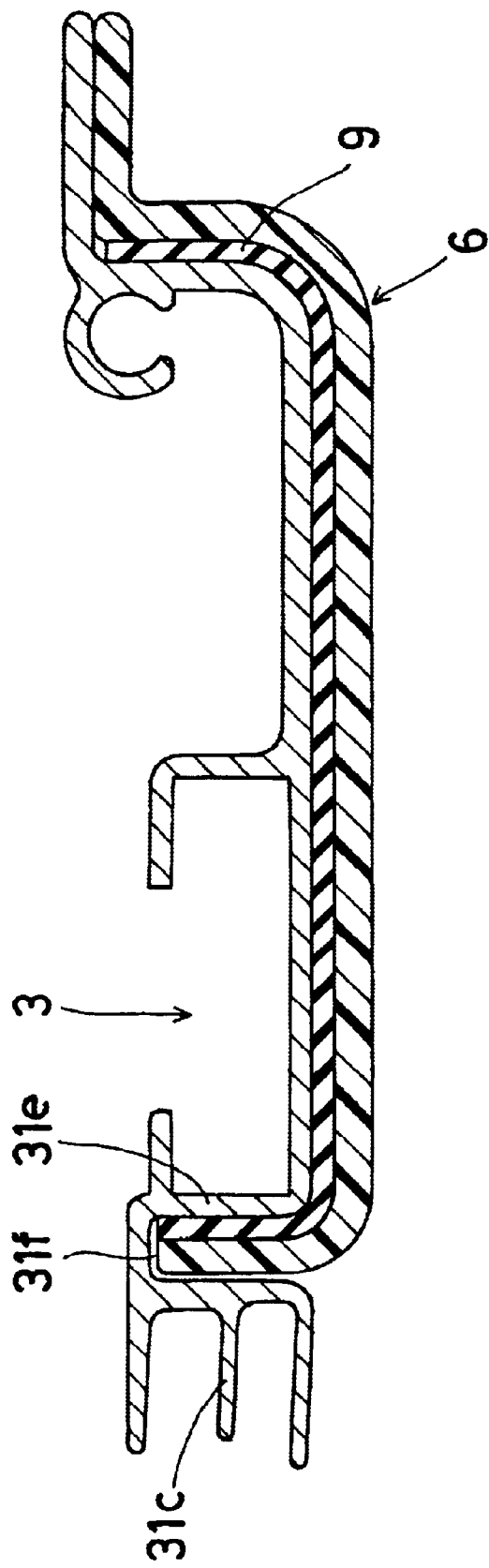
FIG. 8 illustrates a cross-sectional view taken along line E—E in FIG. 7.

Referring now to FIGS. 7 and 8 which illustrate a preassembled structure and an assembled structure, respectively, of a modified sunroof device as a second embodiment of the present invention. A guide rail 3 shown in FIG. 7 differs from the aforementioned guide rail 3 in that the former is provided with a groove portion 31f for receiving the upstanding wall 61d of the second gutter portion 61 between the side wall 31e and the groove portion 31c. Except for such a structure, the modified guide rail 3 is identical with the foregoing guide rail 3 in construction and operation. In addition, as can be seen from FIG. 8, a modified second gutter portion 61 is identical with the second gutter portion 61 of the front frame 6 except that the former is formed to include an upward portion to be fitted in the groove portion 31f at a border portion between the upstanding wall 61d and the side wall 61b. In the aforementioned modified structure, a sealing member 9 is provided in a space which is defined when the integrated structure of the first gutter portion 31 and the guide portion 31 is fitted in the second gutter portion 61. In accordance with the modified structure, the upward wall 61d is made to be extended in the upward direction at the boarder portion between the upward wall 61d and the side wall 61b, which renders the water flown into the second gutter portion 61 difficult to leak from the overlapped portion between the second gutter portion 61 and the first gutter portion 32, thereby establishing a desired result from the view point of sealing function. Moreover, due to the fact that the groove portion 31f of the first gutter portion 31 is brought into engagement with the upstanding wall 61d when the first gutter portion 32 is connected to the second, the connection can be made very easily.

In accordance with the first aspect of the present invention, the upstanding wall of the second gutter portion is provided at a longitudinal distance from the end of the first gutter portion, which makes it possible to prevent a direct invasion of fluid such as rain water into the overlapped portion between the upstanding wall and the first gutter portion. Thus, a sealing member disposed between the first gutter portion and the second gutter portion, is not limited as a bonding agent. Because only a foamed sealing member without a bonding agent is used for the connection sealing the first gutter portion and the second gutter portion, the productivity in assembling the sunroof devices is improved, and also replacement of the sunroof device becomes possible, resulting in improved recycling of the sunroof device.

In addition, at the portion which is in the second gutter portion and which is in the vicinity of the overlapped portion of the first gutter portion and the second gutter portion, the restricting wall is formed for the restriction of the flow in the second gutter portion, which obstructs fluid entry into the overlapped portion of the first gutter portion and the second gutter portion, with the result that the sealing function becomes more improved or preferable.

The invention has thus been shown and description with reference to specific embodiments, however, it should be understood that the invention is in no way limited to the details of the illustrates structures but changes and modifications may be made without departing from the scope of the appended claims.

What is claimed is:

1. A sunroof device comprising:
   a pair of guide rails placed at laterally opposed inner peripheries of an open area of a vehicular roof panel and supporting a movable panel opening and closing the open area;
   a first gutter portion extending along a lengthwise direction of the guide rail;
   a second gutter portion positioned below the first gutter portion and brought into fluid communication with an end of the first gutter portion, the second gutter portion being formed with an upstanding wall located at a distance from the end of the first gutter portion when the second gutter portion is brought into overlap condition in such a manner that the upstanding wall defines an area of the second gutter portion to be overlapped with the first gutter portion;
   wherein at a position in the second gutter portion where the second gutter portion is overlapped with the first gutter portion, a flow restricting wall is provided for restricting flow of fluid in the second gutter portion; and
   wherein the flow restricting wall, inclining relative to a side wall of the second gutter portion and located apart from the side wall, extends towards the upstanding wall.

2. A sunroof device as set forth in claim 1, further comprising:
   a front frame portion extending along a front periphery of the open area of the vehicular roof panel, to which each of the guide rails is connected; wherein the second gutter portion extends along the front frame portion.

3. A sunroof device as set forth in claim 1, wherein the first gutter portion extends between a front end and a rear end, and the second gutter portion is connected to said front end of the first gutter portion.

4. A sunroof device comprising:
   a pair of guide rails placed at laterally opposed inner peripheries of an open area of a vehicular roof panel and supporting a movable panel opening and closing the open area;
   a first gutter portion extending along a lengthwise direction of the guide rail;

a second gutter portion positioned below the first gutter portion and brought into fluid communication with an end of the first gutter portion, the second gutter portion being formed with an upstanding wall locating at a distance from the end of the first gutter portion when the second gutter portion is brought into overlap condition in such a manner that the upstanding wall defines an area of the second gutter portion to be overlapped with the first gutter portion;

wherein at a position in the second gutter portion where the second gutter portion is overlapped with the first gutter portion, a flow restricting wall is provided for restricting flow of fluid in the second gutter portion; and wherein the flow restricting wall, inclining relative to a side wall of the second gutter portion and connected with the side wall, extends away from the upstanding wall.

5. A sunroof device comprising:

a pair of guide rails placed at laterally opposed inner peripheries of an open area of a vehicular roof panel and supporting a movable panel opening and closing the open area;

a first gutter portion extending along a lengthwise direction of the guide rail;

a second gutter portion positioned below the first gutter portion and brought into fluid communication with an end of the first gutter portion, the second gutter portion being formed with an upstanding wall located at a distance from the end of the first gutter portion when the second gutter portion is brought into overlap condition in such a manner that the upstanding wall defines an area of the second gutter portion to be overlapped with the first gutter portion;

wherein at a position in the second gutter portion where the second gutter portion is overlapped with the first gutter portion, a flow restricting wall is provided for restricting flow of fluid in the second gutter portion; and wherein the flow restricting wall includes a first flow restricting wall located apart from a side wall of the second gutter portion and a second flow restricting wall connected with the side wall, and wherein the first flow restricting wall and the second flow restricting wall are arranged alternately.

6. A sunroof device for a vehicle, the vehicle defining a longitudinal direction, the device comprising:

a pair of guide rails extending in the longitudinal direction at laterally opposed inner side peripheries of an open area of a vehicular roof panel and supporting a movable panel for covering and uncovering the open area;

a first gutter portion extending along the longitudinal direction along substantially an entire length of at least one rail of the pair of guide rails; and a second gutter portion positioned below the first gutter portion and brought into fluid communication with an end of the first gutter portion, the second gutter portion being formed with an upstanding wall, the second gutter portion and the first gutter portion being fixedly connected to each other with an overlap so that the upstanding wall is located at a distance from the end of the first gutter portion in such a manner that the upstanding wall and the overlap defines a space between the second gutter portion and the first gutter portion, wherein the upstanding wall extends in a lateral direction and defines an end of the overlap, wherein at a position in the second gutter portion where the second gutter portion is overlapped with the first gutter portion, a flow restricting wall is provided for restricting flow of fluid in the second gutter portion; and wherein the flow restricting wall, inclining relative to a side wall of the second gutter portion and located apart from the side wall, extends towards the upstanding wall.

7. A sunroof device as set forth in claim 6, further comprising a seal member between the upstanding wall and the first gutter portion.

* * * * *